US006236811B1

(12) United States Patent
Clark

(10) Patent No.: US 6,236,811 B1
(45) Date of Patent: May 22, 2001

(54) DEVICE AND METHOD FOR CAPTURING A FLAT FIELD IMAGE

(75) Inventor: Thomas D. Clark, Catawba Island, OH (US)

(73) Assignee: Artsafe, Ltd., Toledo, OH (US)

( * ) Notice: Subject to any disclaimer, the term of this patent is extended or adjusted under 35 U.S.C. 154(b) by 0 days.

(21) Appl. No.: 09/259,063

(22) Filed: Feb. 26, 1999

Related U.S. Application Data

(60) Provisional application No. 60/076,144, filed on Feb. 27, 1998.

(51) Int. Cl.[7] .............................. G03B 15/00; G03B 41/00
(52) U.S. Cl. ................................. 396/5; 396/322; 355/53; 355/75
(58) Field of Search ..................... 396/5, 322, 661; 355/72–76, 53; 40/122, 341, 352

(56) References Cited

U.S. PATENT DOCUMENTS 2,335,697 * 11/1943 Reyniers .
2,348,457 *  5/1944 Drehs .
3,241,434 *  3/1966 Lee et al. .
4,897,678    1/1990 Leberl et al. .
5,649,032    7/1997 Burt et al. .

* cited by examiner

Primary Examiner—David M. Gray
(74) Attorney, Agent, or Firm—Marshall & Melhorn, LLC

(57) ABSTRACT

An image capturing apparatus for capturing a sequence of subsections of a flat field subject image. The image capturing apparatus includes a camera assembly, preferably including a digital camera, and a lighting assembly. The image capturing apparatus further includes an image positioning jig for moving the subject image to a series of predetermined positions relative to the camera assembly for the capture of the subsections of the subject image by the camera. The image positioning jig includes a backing plate for supporting the subject image in an image plane, and a positioning rail for abutting an edge of the subject image for slidable movement along the X-axis of the image plane. A plurality of rail locators are arranged on the backing plate for attaching the positioning rail to the backing plate at predetermined positions along the Y-axis of the image plane. A plurality of image stops are disposed on the backing plate for positioning the image at predetermined locations along the X-axis of the image plane.

20 Claims, 2 Drawing Sheets

DEVICE AND METHOD FOR CAPTURING A FLAT FIELD IMAGE

RELATED APPLICATION

This application is claiming the benefit, under 35 U.S.C. §119(e), of the provisional application filed Feb. 27, 1998 under 35 U.S.C. §111(b), which was granted a Ser. No. of 60/076,144. The provisional application, Ser. No. 60/076,144, is hereby incorporated by reference.

BACKGROUND OF INVENTION

The present invention relates to an apparatus for capturing an image and specifically for an image capturing apparatus for capturing a sequence of portions of a flat field image.

Digital cameras can be used to capture flat field images such as paintings, pictures, drawings, sketches and the like, (hereinafter referred to as the subject image) for storage in digital form. The captured digital data can then be processed, enhanced and combined with other digital information if desired. The digital data representing the subject image may then be displayed in printed media, via a monitor or any other known manner.

To achieve higher resolutions or to capture larger subject images, with limited storage capacities, it is possible to capture portions of the image in sequences and combine them together to form a digital data compilation representing the entire image. One method of digitally capturing flat field subject images includes taking a series of pictures of portions of the image with a digital camera and combining this series of digital photo sections digitally via software to create a digital reproduction of the original image. Accurate positioning of the camera and the subject image during the capture of each photo subsection facilitates recombination of the desired complete image. It is desirable to position the image accurately enough so that the pixels forming the digital representation of each image subsection can be aligned to recombine the subsections into the entire image. Uniform lighting is also required to accurately capture each photo section.

A reseau assembly, as disclosed in Leberl, et al (U.S. Pat. No. 4,926,505), is a known device for obtaining accurate camera positioning. The camera is mounted in the reseau assembly and the subject image is placed in a fixed position within the assembly. The camera is moved to each desired location within the confines of the reseau assembly to capture the corresponding photo section of the subject image. This assembly has limitations in that the reseau assembly must be sufficiently large to place the subject image therein for capture. If a large subject image is to be captured, a large reseau assembly must be used. The reseau assembly is complicated and constructing large assemblies can be quite costly. It is desirable to have a simpler, less costly method and device to capture the photo sections of a subject image which can accommodate an image of any size or can be constructed of sufficient size relatively inexpensively.

SUMMARY OF THE INVENTION

An image capturing apparatus for capturing a sequence of portions of a flat field subject image. The image capturing apparatus includes a camera assembly including a digital camera for digitally capturing portions of the subject image, and a lighting assembly for sufficiently illuminating the subject image. The camera and lighting assemblies are preferably connected together in a rigid, fixed relationship, although optionally they may not be rigidly connected together.

The image capturing apparatus further includes an image positioning jig for moving the subject image to a series of predetermined positions relative to the camera assembly for the capture of predetermined portions of the image. The image positioning jig includes a backing plate for supporting the subject image in an image plane. The camera and lighting assemblies are preferably disposed in a fixed, predetermined position relative to the image plane.

The image positioning jig further includes a positioning rail for abutting an edge of the subject image for slidable movement thereon. A plurality of rail locators are arranged on the backing plate in a plurality of spaced apart groups for positioning the positioning rail along the X-axis of the image plane. The groups of rail locators are spaced apart to position the positioning rail at different locations along the Y-axis of the image plane.

A plurality of image stops are disposed on the backing plate in regularly spaced rows oriented along the X-axis and columns oriented along the Y-axis. Together, the positioning rail and image stops abut adjoining edges of the image to align the image in predetermined positions for capture of a corresponding portion of the image by the camera.

The invention further includes a method of capturing a series of subsections of a flat field subject image. The subject image is placed on the positioning jig backing plate against the positioning rail. The subject image is placed at a first predetermined location defined by the location of the positioning rail on the Y-axis of the image plane, and the location of the image on the image positioning rail along the X-axis of the image plane. The camera captures a subsection of the image at that location.

Next, the image is moved along the positioning rail to a second location for capture of the next subsection of the image while the camera and lights remains in the fixed position. This procedure is repeated until an entire row of subsections of the image are captured. The image positioning rail is then moved to another location along the Y-axis and the entire procedure is repeated capturing another row of subsections of the image. Every subsection of the image can be captured in this manner and the subsections can then be combined to form the entire image.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENTS

Figure 1:
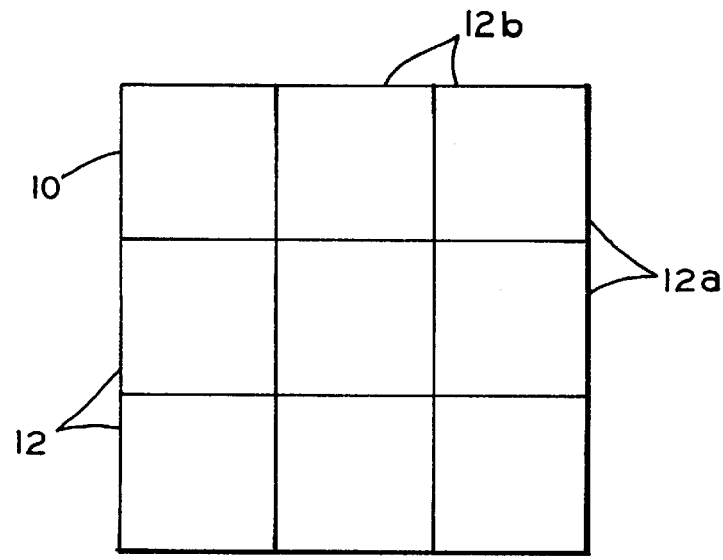
FIG. 1 is an elevational view of an image to be captured according to the invention.

Referring to FIG. 1, an image 10 is shown having a plurality of sub sections 12. The image 10 may be any approximately flat visual image including a painting, photograph, drawing, sketch, lithograph or the like. Each of the image subsections 12 preferably have an approximately equal area. The sub sections 12 are arranged in a plurality of rows 12a and columns 12b covering the entire image 10.

Figure 2:
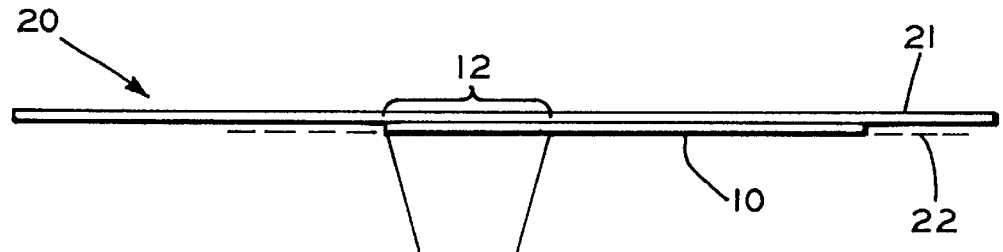
FIG. 2 is a plan view of a camera capturing a subsection of an image according to the invention.
Figure 3:
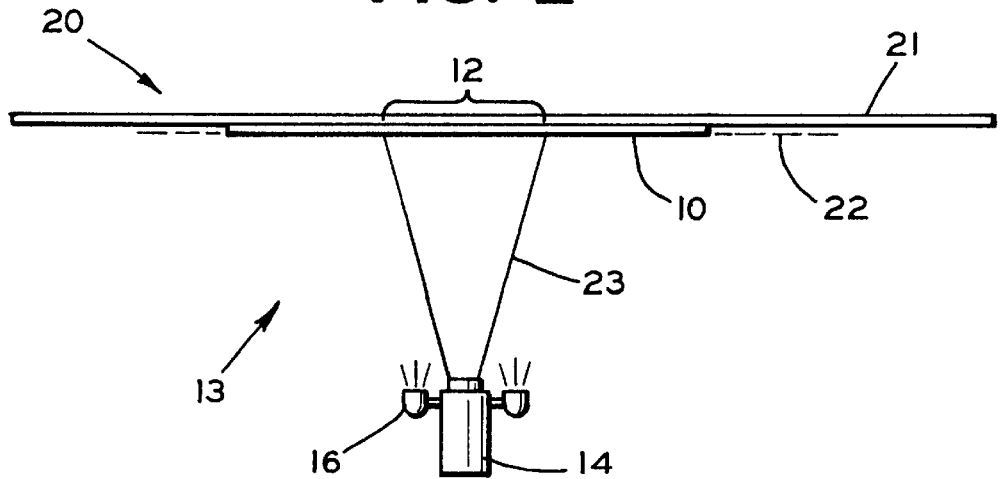
FIG. 3 is a plan view of a camera capturing a subsection of an image according to the invention.

Referring now to FIGS. 2 and 3, an image capturing apparatus is illustrated generally at 13 for capturing a sequence of separate portions of a flat field subject image 10 corresponding to the subsections 12 described above. The image capturing apparatus includes a camera assembly 14. The camera assembly 14 is preferably a digital camera which is known in the art and capable of capturing the images and storing them in digital form, although any suitable camera may be used. The image capturing apparatus 13 also includes a lighting assembly 16 using one or more lights which are known in the art and capable of sufficiently illuminating a portion of the subject image 10 for capture by the camera assembly 14. The camera and lighting assemblies 14, 16 are preferably connected together in a rigid, fixed relationship, although optionally they may not be rigidly connected together.

The image capturing apparatus 13 further includes an image positioning jig 20 for supporting the subject image 10 for movement to a series of predetermined positions relative to the camera assembly 14 for the capture of the individual subsections 12 of the image. The image positioning jig 20 accurately positions the subject image to facilitate realignment of the pixels forming the digital representation of each adjacent image subsection for subsequent recombination into the entire image.

The image positioning jig 20 includes a backing plate 21 for supporting the subject image 10. An image plane 22, having an X-axis and Y-axis, is defined in a parallel, spaced apart relationship to the backing plate 21. When the image 10 is supported by the backing plate 21, the surface of the image is aligned with the image plane 22 such that the subsection rows 12a extend along the X-axis and the subsection columns 12b extend along the Y-axis. The jig 20 includes a frame or stand (not shown) for preferably supporting the backing plate 21 in an upright, approximately vertical position and the jig shall be described in further detail below in this orientation. However, the orientation of the backing plate 21 is not critical to this invention and alternatively, it may be supported in a horizontal position or any other suitable orientation.

The camera and lighting assemblies 14, 16 are preferably disposed in a fixed, predetermined position relative to the image plane 22. The camera has a field of view (illustrated with lines 23) which defines the size of the image it will capture. The field of view 23 covers a predetermined surface area on the image plane 22 which corresponds to one subsection 12 of the image 10.

The camera 14 is shown capturing a subsection 12 of the image 10 to create a digital representation or digital photo of the sub section. The image 10 is then moved along the backing plate 21 to a second position while the camera 14 and lights 16 remains in the fixed position. When the subject image 10 is at the second position, shown in FIG. 3, a different subsection 12 of the image is in the field of view 23 of the camera 14. The camera 14 captures the second subsection of the subject image, and the image is moved again. The image is moved along the X-axis of the image plane until an entire row 12a of subsections 12 of the image are captured. The image 10 is then moved to a new location along the Y-axis of the image plane to capture each subsection 12 in the adjacent row 12a. This process is repeated until all of the image subsections 12 are captured.

Figure 4:
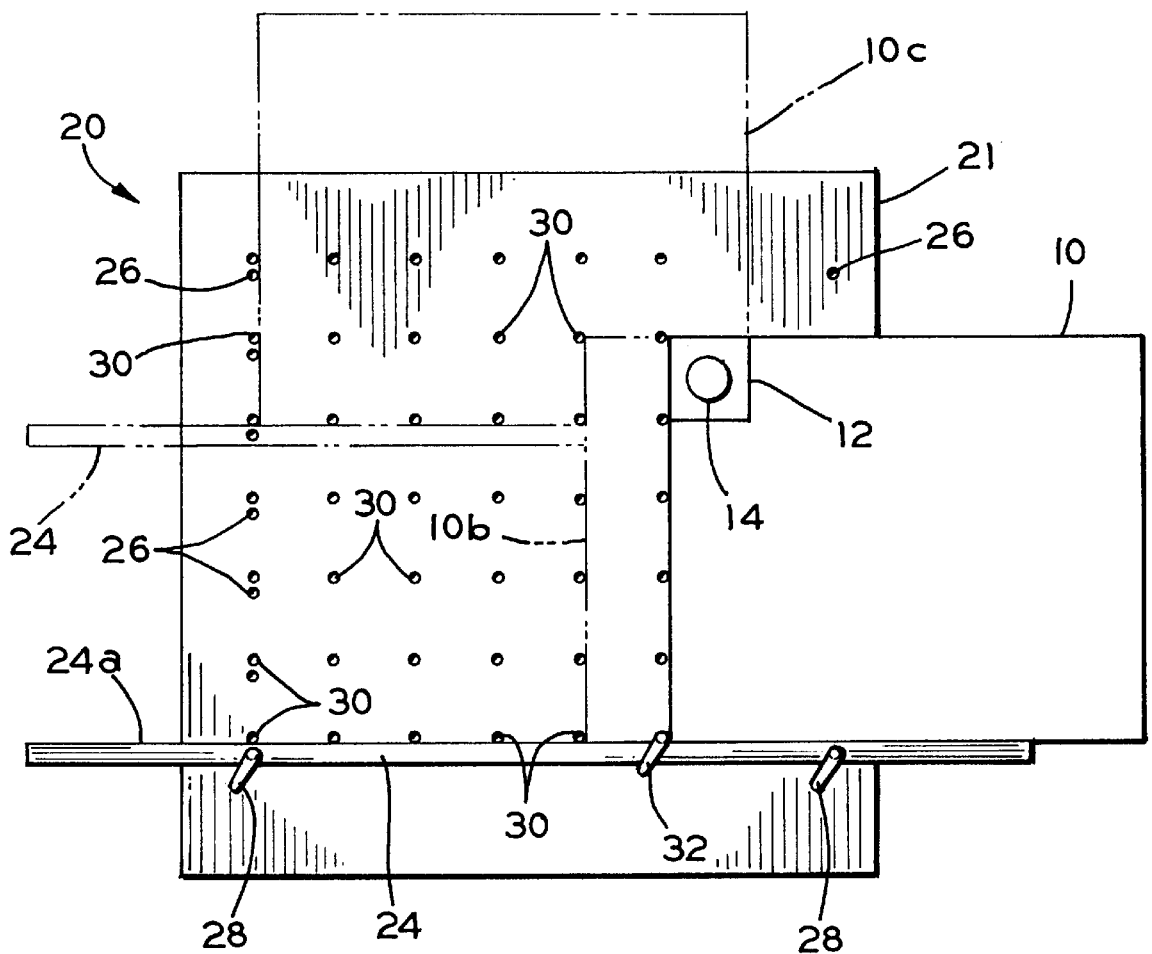
FIG. 4 is an elevational view of an image positioning jig according to the invention.

Referring now to FIG. 4, the image positioning jig 20 is shown in greater detail. The image positioning jig 20 further includes a positioning rail 24. The positioning rail 24 includes a straight support surface 24a extending along the axis of the rail for abutting an edge of the subject image 10 and supporting the image for slidable movement along the X-axis of the image plane 22. The support surface 24a is preferably contoured to match the contour of the edge of the image. The positioning rail is preferably stiff enough to resist appreciable bending thereby keeping the support surface 24a straight when the image 10 is supported thereon. Any stiff member having an axially straight surface may be suitable for use as the positioning rail 24.

A plurality of positioning rail locators 26 are disposed on the backing plate for locating the positioning rail 24 on the backing plate 21 in a predetermined position in the Y-axis of the image plane 22 such that the support surface 24a is in alignment with the X-axis of the image plane 22. At least two or more rail pins 28 having a shape complementary to the positioning rail locators 26 cooperate with the locators to releasably secure the positioning rail 24 to the backing plate 21 at the predetermined location. Preferably, the positioning rail locators 26 are recesses having uniform cross sectional shapes, which are preferably circular, and uniform depths. The rail pins 28 are preferably removable pins which extend from the positioning rail 24 and into the locator recesses 26. However, any suitable protrusions extending from the rail 24 which are complementary to the locator recesses 26 may be used including protrusions which are fixed to the rail. The positioning rail locators 26 and rail pins 28 may include any other suitable means of accurately securing the positioning rail 24 to the backing plate 21.

The positioning rail locators 26 are arranged on the backing plate in a plurality of spaced apart groups. Each group of positioning rail locators is disposed along a straight line oriented along the X-axis of the image plane 22. The positioning rail 24 is oriented along the X-axis when the rail pins 28 are pressed into a group of the positioning rail locator recesses 26. The rail locator groups are regularly spaced apart along the Y-axis so that the positioning rail can be placed in a plurality of different positions along the Y-axis of the image plane 22.

A plurality of image stops 30 are disposed on the backing plate 21 to accurately position the image 12 at different predetermined positions along the X-axis of the image plane 22 as it is supported by the positioning rail 24 and backing plate 21. The image stops 30 are arranged in a series of rows, and the image stops in any particular row are spaced apart along X-axis of the image plane at regular predefined intervals. The rows are spaced apart from each other along the Y-axis of the image plane 22. The image stops 30 are preferably recesses similar to the rail locators 26, capable of receiving an image positioning pin 32. Any suitable recess may be used. The image 10 is accurately positioned in the X-axis of the image plane by moving the image until it abuts the image positioning pin 32 placed in a corresponding image stop 30.

The operation of the positioning jig 20 shall now be described. The camera 14 and lights 16 (not shown in FIG. 4) are supported in a fixed position relative to the jig 20 as shown in FIGS. 2 and 3. The camera 14 remains a fixed distance from the image plane 22 and jig 20 throughout the capturing process. The positioning rail 24 is positioned in a first location along the Y-axis of the image plane 22 by placing the rail pins 28 in the appropriate rail locators 26. The image is placed on the rail 24. An image positioning pin 32 is placed in the appropriate image stop 30 and the image is moved into abutment with the image positioning pin 32 to accurately position the image along the X-axis for capturing the first subsection 12. The camera is operated to capture the subsection, and then the image positioning pin 32 is removed and placed in the next image stop 30. The image 10 is moved along the rail 24 and into abutment with the image positioning pin 32 to properly position the image for capturing the next subsection 12 as shown in phantom at 10b. The camera is operated to capture the subsection and the image is moved again.

When the entire row of subsections are captured, the rail is moved along the Y-axis of the image plane to the next row of rail locators 26. The next row of subsections are captured by moving the image along the rail in a similar manner as previously described. The image is continued to be moved along the Y-axis of the image plane by moving the rail so that each row of subsections can be captured. The rail is shown in phantom in the last vertical position so that last row of subsections can be captured as shown by the image in phantom at 10c. After the camera has captured every subsection of the image, the image subsections can be "stitched" together to form the entire image by aligning adjacent pixels of adjacent subsections using known techniques. The entire image can be digitally process further if so desired and displayed at will.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

We claim:

1. An image capturing apparatus for capturing a sequence of subsections of a flat field subject image comprising:
   a camera assembly disposed in a fixed position; and
   an image positioning jig for moving the subject image to a series of predetermined locations within an image plane for capture of the image subsections by the camera assembly, said image positioning jig including a backing plate for supporting the subject image, and a positioning rail attachable to said backing plate at different predetermined locations along the Y-axis of the image plane, said positioning rail having a support surface for abutting the edge of the image for slidable movement of the image along the X-axis of the image plane.

2. The image capturing apparatus defined in claim 1 wherein support surface is straight and said positioning rail is stiff to reduce bending of the straight support surface.

3. The image capturing apparatus defined in claim 2 further including rail locators disposed on said backing plate for attaching said positioning rail to said backing plate, wherein said rail locators are arranged in spaced apart groups, said groups being spaced along the Y-axis of the image plane, and said rail locators of each individual group are disposed along the X-axis of said image plane.

4. The image capturing apparatus defined in claim 3 wherein said rail locators are recesses formed in said backing plate.

5. The image capturing apparatus defined in claim 4 further including rail pins extending from said positioning rail and into said recesses for releasably attaching said positioning rail to said backing plate.

6. The image capturing apparatus defined in claim 5 wherein said rail pins are removable from said positioning rail.

7. The image capturing apparatus defined in claim 1 further including image stops disposed on said backing plate for positioning said image along the X-axis of said image plane.

8. The image capturing apparatus defined in claim 7 wherein said image stops are arranged in groups, said groups of image stops being spaced apart along the Y-axis of the image plane, wherein said image stops of each individual group are disposed along the X-axis of said image plane.

9. The image capturing apparatus defined in claim 8 wherein said image stops are recesses formed in said backing plate.

10. The image capturing apparatus defined in claim 9 further including removable image positioning pins extending into said image stop recesses for abutting the edge of said subject image to position said subject image at predetermined locations along the X-axis.

11. A positioning jig for positioning a flat field subject image in an image plane for capture of a sequence of subsections of the image by a camera, the positioning jig comprising:
    a backing plate for supporting the subject image in the image plane;
    a positioning rail attachable to said backing plate at different predetermined locations along the Y-axis of the image plane and having a support surface for abutting the edge of the image for slidable movement of the image along the X-axis of the image plane;
    rail locators disposed on said backing plate for orienting said positioning rail along the X-axis of the image plane at different predetermined locations along the Y-axis of the image plane; and
    image stops disposed on said backing plate for positioning said image at predetermined locations along the X-axis of said image plane.

12. The image capturing apparatus defined in claim 11 wherein support surface is straight and said positioning rail is stiff to reduce bending of the straight support surface.

13. The image capturing apparatus defined in claim 12 wherein said rail locators are arranged in spaced apart groups, said groups being spaced along the Y-axis of the image plane, and said rail locators of each individual group are disposed along the X-axis of said image plane.

14. The image capturing apparatus defined in claim 13 wherein said rail locators are recesses formed in said backing plate.

15. The image capturing apparatus defined in claim 14 further including rail pins extending from said positioning rail and into said recesses for releasably attaching said positioning rail to said backing plate.

16. The image capturing apparatus defined in claim 15 wherein said rail pins are removable from said positioning rail.

17. The image capturing apparatus defined in claim 11 wherein said image stops are arranged in groups, said groups of image stops being spaced apart along the Y-axis of the image plane, and said image stops of each individual group are disposed along the X-axis of said image plane.

18. The image capturing apparatus defined in claim 17 wherein said image stops are recesses formed in said backing plate.

19. The image capturing apparatus defined in claim 18 further including removable image positioning pins extending said image stop recesses for abutting the edge of said subject image to position said subject image at predetermined locations along the X-axis.

20. A method of capturing a series of subsections of a flat field subject image comprising:
    a) providing an image positioning jig having a backing plate for supporting the subject image in an image plane, and a positioning rail oriented along the X-axis of the image plane attachable to the backing plate at different locations along the Y-axis of the image plane;

b) providing a camera disposed in a fixed position relative to the image plane;

c) attaching the positioning rail to the backing plate in a first predetermined position along the Y-axis of the image plane;

d) placing the image on the image positioning jig against the backing plate and in abutment with a support surface of the positioning rail in a first predetermined position with respect to the positioning rail;

e) capturing a sub section of the image with the camera;

f) moving the image along the positioning rail to the next position with respect to the positioning rail;

g) repeating steps e and f to capture a row of subsections of the image;

h) moving the positioning rail to another position along the Y-axis of the image plane; and i) repeating steps d through h until the desired number of subsections of the image have been captured.

\* \* \* \* \*